(12) United States Patent
Chang et al.

(10) Patent No.: US 9,891,360 B2
(45) Date of Patent: Feb. 13, 2018

(54) OPTICAL FILM

(71) Applicant: LG CHEM, LTD., Seoul (KR)

(72) Inventors: Jun Won Chang, Daejeon (KR); Su Young Ryu, Daejeon (KR); Moon Su Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/434,677

(22) PCT Filed: Nov. 29, 2013

(86) PCT No.: PCT/KR2013/011042
§ 371 (c)(1),
(2) Date: Apr. 9, 2015

(87) PCT Pub. No.: WO2014/084687
PCT Pub. Date: Jun. 5, 2014

(65) Prior Publication Data
US 2015/0285978 A1   Oct. 8, 2015

(30) Foreign Application Priority Data

Nov. 29, 2012 (KR) .................. 10-2012-0137418
Nov. 29, 2013 (KR) .................. 10-2013-0147863

(51) Int. Cl.
*G02B 5/30* (2006.01)
*B29D 11/00* (2006.01)
(Continued)

(52) U.S. Cl.
CPC ...... *G02B 5/3016* (2013.01); *B29D 11/00788* (2013.01); *C09K 19/3809* (2013.01); *C09K 19/54* (2013.01); *G02B 1/14* (2015.01); *B32B 2457/202* (2013.01); *G02B 1/16* (2015.01); *G02F 1/133528* (2013.01); *G02F 2202/022* (2013.01)

(58) Field of Classification Search
None
See application file for complete search history.

(56) References Cited

U.S. PATENT DOCUMENTS

2004/0209006 A1* 10/2004 Matsumoto ........ C09K 19/3852
 428/1.1
2005/0014913 A1*  1/2005 Kim ........................ C08J 5/18
 526/90
(Continued)

FOREIGN PATENT DOCUMENTS

CN    1751083 A    3/2006
EP    1428823 A1   6/2004
(Continued)

*Primary Examiner* — Anthony J Frost
(74) *Attorney, Agent, or Firm* — Dentons US LLP (57) ABSTRACT

Provided are an optical film and a display device including the same. The optical film may be disposed at the outermost side of a display device, such as a liquid crystal display or an organic light emitting display, or at an outside of a polarizing layer of the display in which the polarizing layer is disposed at a visible side. The film disposed as described above may overcome degradation of brightness that may occur when an observer watches an image with polarizing sunglasses. The optical film may also have hardness suitable for its use.

13 Claims, 1 Drawing Sheet

(51) Int. Cl.
*C09K 19/38* (2006.01)
*C09K 19/54* (2006.01)
*G02B 1/14* (2015.01)
*G02F 1/1335* (2006.01)
*G02B 1/16* (2015.01)

(56) References Cited

U.S. PATENT DOCUMENTS

| | | | |
|---|---|---|---|
| 2006/0172090 A1 | 8/2006 | Syundo | |
| 2007/0275234 A1 | 11/2007 | Lim et al. | |
| 2008/0158488 A1* | 7/2008 | Yanai | G02F 1/133371 349/107 |
| 2009/0117292 A1 | 5/2009 | Tamura | |
| 2009/0142562 A1* | 6/2009 | Miyagawa | B32B 7/02 428/212 |
| 2012/0092594 A1* | 4/2012 | Toyama | G02B 5/3025 349/96 |
| 2012/0147304 A1 | 6/2012 | Yanai et al. | |
| 2012/0169970 A1* | 7/2012 | Fukuda | G02B 5/3025 349/74 |
| 2012/0257128 A1* | 10/2012 | Seo | G02B 27/2214 349/15 |
| 2013/0100367 A1 | 4/2013 | Takahashi et al. | |

FOREIGN PATENT DOCUMENTS

| | | |
|---|---|---|
| JP | 2003-096066 A | 4/2003 |
| JP | 2005-309255 A | 11/2005 |
| JP | 2007-233014 A | 9/2007 |
| JP | 10-2012-0091469 A1 | 12/2008 |
| JP | 2010-032655 A | 2/2010 |
| JP | 2012-083694 A | 4/2012 |
| JP | 2012-189687 A | 10/2012 |
| JP | 2012-198282 A | 10/2012 |
| KR | 10-1199278 B | 6/2007 |
| KR | 10-2007-0087593 A | 8/2007 |
| KR | 10-2008-0109052 A | 12/2008 |
| KR | 10-2009-0029537 A | 3/2009 |
| KR | 10-2009-0035940 A | 4/2009 |
| KR | 10-2011-0138362 A1 | 10/2010 |
| KR | 10-2012-0116887 A | 10/2012 |
| TW | 200624539 A | 7/2006 |
| TW | 200911536 A | 3/2009 |
| WO | 2011/162204 A1 | 12/2011 |

* cited by examiner

OPTICAL FILM

This application is a National Stage Entry of International Application No. PCT/KR2013/011042, filed on Nov. 29, 2013, which claims priority to and the benefit of Korean Patent Application No. 10-2012-0137418, filed on Nov. 29, 2012 and Korean Patent Application No. 10-2013-0147863 filed, on Nov. 29, 2013, all of which are hereby incorporated herein by reference in their entirety.

TECHNICAL FILED

The present application relates to an optical film and its application.

BACKGROUND

A display device such as a liquid crystal display (LCD) or an organic light emitting display (OLED) may include a polarizing layer to control optical characteristics or prevent reflection. For example, when such display devices are seen with polarizing sunglasses, according to a relationship between the polarizing layer in the device and a polarizing axis of the polarizing sunglasses, brightness of an image seen by an observer is degraded, or an image may not be seen in some cases. Image seen by an observer is degraded, or an image may not be seen in some case. In the patent document 1, a structure of a display device is proposed to solve the above-desired problem.

PRIOR ART DOCUMENT (Patent document 1) Korean Laid-Open Patent Application No. 2009-0035940

DETAILED DESCRIPTION

Technical Object

The present application is directed to providing an optical film and its application.

Technical Solution

One aspect of the present application provides an exemplary optical film, which may be disposed on an outer side of a polarizing layer of a display device including the polarizing layer on its outermost or visible side. The term "outside" used herein may refer to, unless particularly defined otherwise, a part of a display device that shows an image, for example, a direction of the display device toward an observer observing the display device. In addition, here, the polarizing layer on the visible side may refer to a polarizing layer disposed on the outermost side, that is, that closest to the observer, when the display device includes at least two polarizing layers. In addition, here, the outside of the polarizing layer may refer to a direction of the polarizing layer toward the observer.

The optical film may include a liquid crystal layer. The liquid crystal layer may have a ¼ phase retardation characteristic with respect to at least one wavelength of a range of wavelengths included in a visible region, that is, in-plane retardation capable of converting incident linearly-polarized light into circularly polarized light or elliptically polarized light, or converting inversely-incident circularly polarized light or elliptically polarized light into linearly polarized light. For example, the liquid crystal layer may have in-plane retardation measured with respect to light with a wavelength of approximately 550 nm of approximately 80 nm to 200 nm or 90 nm to 150 nm. The liquid crystal layer having such a range of retardation is disposed in a display device, and thus a problem of degrading brightness occurring, for example, when an observer observes an image with polarizing sunglasses can be prevented.

The term "in-plane retardation" used herein is a value measured by Formula 1.

$$R_{in}=d \times (n_x-n_y) \quad \text{[Formula 1]}$$

In Formula 1, $R_{in}$, is in-plane retardation, d is a thickness of the liquid crystal layer, $n_x$ is a refractive index in a slow axis, and $n_y$ is a refractive index in a fast axis.

The liquid crystal layer may or may not have thickness-direction retardation. For example, the liquid crystal layer may have thickness-direction retardation with respect to light with a wavelength of 550 nm of approximately −20 nm to 20 nm or −10 nm to 10 nm.

The term "thickness-direction retardation" used herein is a value measured by Formula 2.

$$R_{th}=d \times (n_z-n_y) \quad \text{[Formula 2]}$$

In Formula 2, $R_{th}$ is thickness-direction retardation, d is a thickness of the liquid crystal layer, $n_z$ is a refractive index in a thickness direction, and $n_y$ is a refractive index in a fast axis direction The liquid crystal layer may have a surface hardness of 1H, 2H, 3H or 4H or more. The surface hardness of the liquid crystal layer may be obtained by controlling components of the liquid crystal composition forming the liquid crystal layer as will be described below. The liquid crystal layer having the above range of surface hardness is suitable for use in the present application disposed on the outermost side. Here, the surface hardness is a pencil hardness measured at a pencil load of 500 g and a pencil transferring rate of 250 mm/min according to ASTM D3363. The upper limit of the surface hardness is not particularly limited, but the surface hardness may be, for example, 8H, 7H, or 6H or less.

The liquid crystal layer may include a cured layer of the liquid crystal composition including a polymerizable liquid crystal material including a polymerizable liquid crystal compound. The "liquid crystal material" used herein is a component formed of a polymerizable liquid crystal compound to be described below, for example, any one of or a mixture of at least two of the following polymerizable liquid crystal compounds.

Components of the liquid crystal composition may be controlled in various methods for the liquid crystal layer to have the above-described hardness. For example, as will be described below, the liquid crystal material may include a multifunctional polymerizable liquid crystal compound in a predetermined ratio or more, or may further include a compound having a functional group capable of reacting with the polymerizable liquid crystal compound. Alternatively, a ratio of a multifunctional polymerizable liquid crystal compound in the liquid crystal material may be controlled, and a compound having a functional group capable of reacting with the polymerizable liquid crystal compound may be further included.

The term "polymerizable liquid crystal compound" used herein may refer to a compound including a part capable of showing liquid crystallinity, for example, a mesogen backbone, and at least one polymerizable functional group.

To ensure suitable hardness, the liquid crystal material may be formed of only a multifunctional polymerizable liquid crystal compound, or may include a multifunctional polymerizable liquid crystal compound and a monofunctional polymerizable liquid crystal compound in a suitable ratio.

The term "multifunctional polymerizable liquid crystal compound" used herein may be a compound including at least two polymerizable functional groups of the liquid crystal compounds. In one example, the multifunctional polymerizable liquid crystal compound may include 2 to 10, 3 to 8, 3 to 6, 3 to 5, 3 to 4, 2 or 3 polymerizable functional groups. In addition, the term "monofunctional polymerizable liquid crystal compound" used herein may refer to a compound including one polymerizable functional group of the liquid crystal compounds.

The multifunctional or monofunctional polymerizable liquid crystal compound may be, for example, a compound represented by Formula 1. In the case of the multifunctional compound, at least two polymerizable functional groups of Formula 1 may be included, and in the case of the monofunctional compound, one polymerizable functional group of Formula 1 may be included.

[Formula 1]

In Formula 1, A is a single bond, —COO— or —OCO—, $R_1$ to $R_{10}$ are each independently hydrogen, halogen, an alkyl group, an alkoxy group, an alkoxycarbonyl group, a cyano group, a nitro group, —O-Q-P, —OC(=O)—O-Q-P or a substituent of Formula 2. Benzene substituted with —O-Q-P may be formed by connecting at least a pair of two adjacent substituents of $R_1$ to $R_5$ or two adjacent substituents of $R_6$ to $R_{10}$. Here, Q is an alkylene group or an alkylidene group, and P is a polymerizable functional group such as an alkenyl group, an epoxy group, a cyano group, a carboxyl group, an acryloyl group, a methacryloyl group, an acryloyloxy group, or a methacryloyloxy group.

[Formula 2]

In Formula 2, B is a single bond, —COO— or —OCO—, $R_{11}$ to $R_{15}$ are each independently hydrogen, halogen, an alkyl group, an alkoxy group, an alkoxycarbonyl group, a cyano group, a nitro group, —O-Q-P, or —OC(=O)—O-Q-P. Benzene substituted with —O-Q-P is formed by connecting a pair of adjacent substituents of $R_{11}$ to $R_{15}$, and here, at least one of $R_{11}$ to $R_{15}$ is —O-Q-P. Benzene substituted with —O-Q-P is formed by connecting a pair of adjacent substituents of $R_{11}$ to $R_{15}$, and here, Q is an alkylene group or an alkylidene group, and P is a polymerizable functional group such as an alkenyl group, an epoxy group, a cyano group, a carboxyl group, an acryloyl group, a methacryloyl group, an acryloyloxy group, or a methacryloyloxy group.

In Formulas 1 and 2, the forming of benzene substituted with —O-Q-P by connecting two adjacent substituents may mean that two adjacent substituents are connected to each other, and thereby a naphthalene backbone substituted with —O-Q-P is formed.

In Formula 2, the mark "-" on the left of B may indicate that B is directly connected to the benzene of Formula 1.

In Formulas 1 and 2, the term "single bond" indicates that there is no atom at the part represented as A or B. For example, in Formula 1, when A is a single bond, benzenes at both sides of A may be directly connected to each other, thereby forming a biphenyl structure.

In Formulas 1 and 2, the halogen may be, for example, chlorine, bromine or iodine.

The term "alkyl group" may be, unless particularly defined otherwise, for example, a linear or branched alkyl group having 1 to 20, 1 to 16, 1 to 12, 1 to 8 or 1 to 4 carbon atoms, or a cycloalkyl group having 3 to 20, 3 to 16 or 4 to 12 carbon atoms. The alkyl group may be optionally substituted with at least one substituent.

The term "alkoxy group" may be, unless particularly defined otherwise, an alkoxy group having 1 to 20, 1 to 16, 1 to 12, 1 to 8 or 1 to 4 carbon atoms. The alkoxy group may be a linear, branched or cyclic type. In addition, the alkoxy group may be optionally substituted with at least one substituent.

The term "alkylene group" or "alkylidene group" may be, unless particularly defined otherwise, an alkylene or alkylidene group having 1 to 12, 4 to 10 or 6 to 9 carbon atoms. The alkylene or alkylidene group may be a linear, branched or cyclic type. In addition, the alkylene or alkylidene group may be optionally substituted with at least one substituent.

In addition, the term "alkenyl group" may be, unless particularly defined otherwise, an alkenyl group having 2 to 20, 2 to 16, 2 to 12, 2 to 8, or 2 to 4 carbon atoms. The alkenyl group may be a linear, branched or cyclic type. In addition, the alkenyl group may be optionally substituted with at least one substituent.

In addition, in Formulas 1 and 2, P may be an acryloyl group, a methacryloyl group, an acryloyloxy group or a methacryloyloxy group, preferably an acryloyloxy group or a methacryloyloxy group, and more preferably an acryloyloxy group.

In the specification, as a substituent capable of being substituted with a specific functional group, an alkyl group, an alkoxy group, an alkenyl group, an epoxy group, an oxo group, an oxetanyl group, a thiol group, a cyano group, a carboxyl group, an acryloyl group, a methacryloyl group, an acryloyloxy group, a methacryloyloxy group or an aryl group may be used, but the present application is not limited thereto.

In the case of the monofunctional polymerizable liquid crystal compound, —O-Q-P or a residue of Formula 2 including the —O-Q-P, one of which may be present in Formula 1, may be present at any one of $R_2$, $R_3$, $R_4$, $R_7$, $R_8$ or $R_9$, and when the residue of Formula 2 is present, the —O-Q-P may be present at one of $R_{12}$, $R_{13}$ or $R_{14}$. In addition, substituents linked to each other to constitute benzene substituted with —O-Q-P may be, for example, $R_3$ and $R_4$, or $R_{12}$ and $R_{13}$.

In the case of the multifunctional polymerizable liquid crystal compound, for example, a bifunctional or tri- or higher-functional polymerizable liquid crystal compound, —O-Q-P or a residue of Formula 2 including —O-Q-P may be present at least two of $R_2$, $R_3$, $R_4$, $R_7$, $R_8$ or $R_9$, and when the residue of Formula 2 is present, the —O-Q-P may be present at one of $R_{12}$, $R_{13}$ or $R_{14}$. As the tri- or higher-functional polymerizable liquid crystal compound, for example, the residue of Formula 2 is present at any one of $R_{12}$, $R_{13}$ and $R_{14}$, and a polymerizable liquid crystal compound in which —O-Q-P is present at one or two of $R_2$, $R_3$ and $R_4$ and one or two of $R_{12}$, $R_{13}$ and $R_{14}$ may be used.

In the polymerizable liquid crystal compound of Formula 1 or the residue of Formula 2, a substituent other than —O-Q-P or the residue of Formula 2, or a substituent other than the substituents linking to each other to form benzene, may be, for example, hydrogen, halogen, a linear or branched alkyl group having 1 to 4 carbon atoms, an alkoxycarbonyl group including a linear or branched alkoxy group having 1 to 4 carbon atoms, a cycloalkyl group having 4 to 12 carbon atoms, an alkoxy group having 1 to 4 carbon atoms, a cyano group or a nitro group, and in another example, may be chlorine, a linear or branched alkyl group having 1 to 4 carbon atoms, a cycloalkyl group having 4 to 12 carbon atoms, an alkoxy group having 1 to 4 carbon atoms, an alkoxycarbonyl group including a linear or branched alkoxy group having 1 to 4 carbon atoms, or a cyano group.

In one example, to satisfy the above-described surface hardness, the liquid crystal material may include the multifunctional polymerizable liquid crystal compound in an amount of at least 50 wt % or more. The upper limit of a ratio of the multifunctional polymerizable liquid crystal compound in the liquid crystal material is not particularly limited. For example, all polymerizable liquid crystal compounds included in the liquid crystal material may be multifunctional polymerizable liquid crystal compounds. In addition, in consideration of processability or alignment, a monofunctional polymerizable liquid crystal compound may be further included, and when the monofunctional polymerizable liquid crystal compound is included, the ratio of the multifunctional polymerizable liquid crystal compound in the liquid crystal material may be, for example, approximately 50 wt % to 90 wt %, 50 wt % to 80 wt %, 50 wt % to 70 wt %, or 50 wt % to 60 wt %.

As the multifunctional polymerizable liquid crystal compound, a bifunctional polymerizable liquid crystal compound having usually two polymerizable functional groups is used. However, in consideration of efficiency of ensuring surface hardness, as the multifunctional polymerizable liquid crystal compound, at least 3 polymerizable functional groups, for example, 3 to 10, 3 to 8, or 3 to 6 polymerizable liquid crystal compounds (hereinafter referred to as a tri- or higher-functional polymerizable liquid crystal compound), may be used, or a mixture of a bifunctional polymerizable liquid crystal compound and the tri- or higher-functional polymerizable liquid crystal compound may be used. When the tri- or higher-functional polymerizable liquid crystal compound is used, a ratio of the tri- or higher-functional polymerizable liquid crystal compound is not particularly limited, but for example, may be 8 wt % or more, 8 wt % to 20 wt %, 8 wt % to 15 wt %, or 10 wt % to 15 wt % with respect to the liquid crystal material. As described above, when the tri- or higher-functional polymerizable liquid crystal compound is used, it is preferable to form a layer having a higher surface hardness, for example, a surface hardness of 2H or 3H or more.

In another example, to ensure the surface hardness, the liquid crystal composition may further include a reactive non-liquid crystal compound. The term "reactive non-liquid crystal compound" used herein may refer to a compound having a functional group capable of reacting with a polymerizable functional group of the polymerizable liquid crystal compound. The reactive compound may be, for example, a non-liquid crystal compound having no liquid crystallinity.

The reactive compound may have two or more, three or more, or four or more, and preferably four or more functional groups capable of reacting with the polymerizable functional group. The upper limit of the functional groups in the reactive compound is not particularly limited. However, when there are too many functional groups, they may have an influence on the alignment property of liquid crystals, and thus usually 10 or fewer, 8 or fewer, or 6 or fewer functional groups may be present.

The reactive compound may react with the polymerizable liquid crystal compound to control the hardness of the liquid crystal layer in the process of forming a liquid crystal layer.

As the functional group that can react with a polymerizable functional group, for example, a functional group including an ethylene-like unsaturated double bond, which may be crosslinked or polymerized with a liquid crystal compound by a free radical reaction may be used. As such a functional group, one or at least two of an alkenyl group, an epoxy group, a cyano group, a carboxyl group, an acryloyl group or a methacryloyl group may be included. As the functional group, a vinyl group, an allyl group, an acryloyl group or a methacryloyl group may be used, or an acryloyl group or a methacryloyl group may be used, but the present application is not limited thereto.

In one example, the reactive compound may be a compound having 2 or more, 3 or more, or 4 or more functional groups capable of reacting with a polymerizable liquid crystal compound, and a molecular weight or a weight average molecular weight of 200 to 5,000 or 200 to 1,000. In the ranges of the number of such functional groups and a molecular weight or a weight average molecular weight, the compound may ensure suitable surface hardness without diminishing a retardation characteristic of the liquid crystal layer. The functional groups of the compound may usually be 10 or fewer, 8 or fewer, or 6 or fewer.

As the reactive compound, a multifunctional acrylate such as trimethylolpropane tri(meth)acrylate, pentaerythritol tri(meth)acrylate, pentaerythritol tetra(meth)acrylate, dipentaerythritol penta(meth)acrylate, dipentaerythritol hexa(meth)acrylate, triglycerol di(meth)acrylate, tripropyleneglycol di(meth)acrylate, tetraethyleneglycol di(meth)acrylate, pentaerythritol di(meth)acrylate, 1,6-hexanediol di(meth)acrylate, glycerol di(meth)acrylate, tris[2-(acryloyloxy)ethyl] isocyanurate, urethane acrylate, glycerol 1,3-diglycerolate di(meth)acrylate or tri(propyleneglycol) glycerolate diacrylate; an alkenyl (meth)acrylate such as vinyl (meth)acrylate or allyl (meth)acrylate; an alkoxy polyalkyleneglycol (meth)acrylate such as butoxy triethyleneglycol (meth)acrylate; a succinic acid acryloyloxyalkylester such as mono-2-(acryloyloxy)ethyl succinate; a (meth)acryloyloxyalkyl (meth)acrylate such as 3-(acryloyloxy)-2-hydroxypropyl (meth)acrylate; (meth)acrylamide or a derivative thereof such as (meth)acrylamide, diacetone (meth)acrylamide, N-[tris(hydroxymethyl)methyl]acrylamide, N,N-(1,2-dihydroxyethylene)bisacrylamide, N,N-(1,2-dihydroxyethylene)bis acrylamide or N,N-methylenebis(acrylamide); an acetamidoacrylic acid alkyl ester such as methyl 2-acetamidoacrylate; a triazine substituted with a (meth)acryloyl group or an alkenyl group such as 1,3,5-triacryloylhexahydro-1,3,5-triazine or 2,4,6-triallyloxy-1,3,5-triazine; an isocyanurate substituted with an epoxy group such as tris (2,3-epoxypropyl) isocyanurate; a tetracyanoalkylene oxide such as tetracyanoethylene oxide, a carboxylate substituted with an alkenyl group such as triallyl benzene tricarboxylate, a caprolactone (meth)acryloyloxyalkyl ester such as caprolactone 2-((meth)acryloyloxy)ethyl ester, a maleic acid (meth)acryloyloxyalkyl ester such as mono-2-((meth)acryloyloxy)ethyl malate, a polyvalent carboxylic acid such as 1,2,3-triazole-4,5-dicarboxylic acid, an alkanediol substituted with an alkenyl group such as 3-allyloxy-1,2-propanediol, an alkane substituted with a glycidyl oxyphenyl group such as bis[4-(glycidyloxy)phenyl]methane, a dioxalene compound substituted with an alkenyl group such as 2-vinyl-1,3-dioxalane, or a poly(melamine-co-formaldehyde) may be used, but the present application is not limited thereto. The term "(meth)acryl" used herein refers to acryl or methacryl.

The illustrative reactive compound may be optionally substituted with at least one substituent.

In one example, as the reactive compound, a multifunctional acrylate may be used. As the multifunctional acrylate, pentaerythritol triacrylate, dipentaerythritol hexaacrylate, tris[2-(acryloyloxy)ethyl] isocyanurate or urethane acrylate may be used, but the present application is not limited thereto. Here, as the urethane acrylate, a compound commercially produced by Cytec under the trade name of EB1290, UP135, UP111 or UP128 may be used.

For example, as the reactive compound, a compound represented by Formula 3 or 4 may be used.

[Formula 3]

In Formula 3, M is an alkylene group or an alkylidene group, and $R_1$ is hydrogen or an alkyl group.

[Formula 4]

In Formula 4, Z may be an oxygen atom, a nitrogen atom, a sulfur atom, an alkylene group or an alkylidene group, R and Q may each independently be an alkylidene group or an alkylidene group, and $R_1$ to $R_6$ may each independently be hydrogen, halogen, an alkyl group, an alkoxy group, an alkoxycarbonyl group, a cyano group, a nitro group, a (meth)acryloyl group or a (meth)acryloyloxy group. However, in Formula 4, two or more, three or more, four or more, five or more or all of $R_1$ to $R_6$ are (meth)acryloyl groups or (meth)acryloyloxy groups.

An alkylene or alkylidene group at M of Formula 3 or R, Z and O of Formula 4 may be a linear, branched or cyclic alkylene or alkylidene group having 1 to 20, 1 to 16, or 3 to 16 carbon atoms, and may be optionally substituted with at least one substituent. In addition, the cyclic structure may also include a combination cyclic structure such as a structure in which two ring structures are condensed while sharing a carbon atom, as well as a spiro structure.

In Formulas 3 and 4, details on halogen, an alkyl group, an alkoxy group or an alkoxycarbonyl group may be the same as described with regard to Formula 1.

When the reactive compound is included, the liquid crystal material may or may not include a multifunctional polymerizable liquid crystal compound, but to ensure suitable surface hardness, a multifunctional polymerizable liquid crystal compound may be included. When the multifunctional polymerizable liquid crystal compound is included, the multifunctional polymerizable liquid crystal compound may be included in the liquid crystal material at a ratio of approximately 45 wt % or more. The upper limit of the ratio of the multifunctional polymerizable liquid crystal compound is not particularly limited. For example, all of the polymerizable liquid crystal compound included in the liquid crystal material may be a multifunctional polymerizable liquid crystal compound. When a monofunctional polymerizable liquid crystal compound is added, a ratio of the multifunctional polymerizable liquid crystal compound in the liquid crystal material may be, for example, approximately 45 wt % to 90 wt %, 45 wt % to 80 wt %, 45 wt % to 70 wt %, or 45 wt % to 60 wt %.

When the reactive compound is included, as the multifunctional polymerizable liquid crystal compound, a bifunctional polymerizable liquid crystal compound or a mixture of a bifunctional polymerizable liquid crystal compound and a tri- or higher-functional polymerizable liquid crystal compound may be used, and when the tri- or higher-functional polymerizable liquid crystal compound is used, a ratio of the tri- or higher-functional polymerizable liquid crystal compound may be, but is not particularly limited to, for example, 8 wt % or more, 8 wt % to 20 wt %, 8 wt % to 15 wt %, or 10 wt % to 15 wt % or more with respect to the weight of the liquid crystal material.

The reactive compound may be included in a ratio of 5 parts by weight or less, less than 5 parts by weight, 4 parts by weight or less, or 3.5 parts by weight or less with respect to 100 parts by weight of the polymerizable liquid crystal material in the liquid crystal composition. When the ratio of the reactive non-liquid crystal compound is excessively high, the alignment property of liquid crystals may be degraded. The lower limit of the ratio of the reactive non-liquid crystal compound is not particularly limited, and may be, for example, 0.5 parts by weight or 1 part by weight.

A liquid crystal composition including the reactive non-liquid crystal compound, or including a multifunctional polymerizable liquid crystal compound in addition to the non-liquid crystal compound may be suitable for forming a layer having a surface hardness of 2H or 3H or more after curing, and particularly, a liquid crystal composition including the non-liquid crystal compound and a tri- or higher-functional polymerizable liquid crystal compound may be suitable for forming a layer having a surface hardness of 3H or more.

The liquid crystal composition may further include an optional additive that may be required for the polymerizable liquid crystal composition, for example, a surfactant, a labeling agent, a non-polymerizable liquid crystal compound or a polymerization initiator, or an anti-static agent as will be described below in a suitable ratio, in addition to the above-described components.

A liquid crystal layer may be formed by curing the liquid crystal composition in an aligned state. Accordingly, for example, the polymerizable liquid crystal compound may be included in the liquid crystal layer in a horizontally-aligned state. In one example, the compound may be polymerized in a horizontally-aligned state. The term "horizontally-aligned" used herein may refer to the case in which an optical axis of the liquid crystal layer included in the liquid crystal compound has a tilt angle of approximately 0 degrees to 25 degrees, 0 degrees to 15 degrees, 0 degrees to 10 degrees, 0 degrees to 5 degrees, or 0 degrees based on a plane of the liquid crystal layer.

In one example, the liquid crystal layer may have a difference between a refractive index in an in-plane slow axis direction and a refractive index of an in-plane fast axis direction of 0.05 to 0.2, 0.07 to 0.2, 0.09 to 0.2, or 0.1 to 0.2. The refractive index of an in-plane slow axis direction may refer to a refractive index in a direction showing the highest refractive index on the plane of the liquid crystal layer, and the refractive index in a fast axis direction may refer to a refractive index in the lowest refractive index on the plane of the liquid crystal layer. Conventionally, in the optically-anisotropic liquid crystal layer, the fast and slow axes are formed perpendicular to each other. Each refractive index may be a refractive index measured with respect to light with a wavelength of 550 nm or 589 nm. The difference in refractive index may be measured, for example, according to a manual of a manufacturer using Axoscan produced by Axomatrix. The liquid crystal layer may also have a thickness of approximately 0.5 μm to 2.0 μm, or 0.5 μm to 1.5 μm. The liquid crystal layer having the relationship of the refractive indexes and the thickness may realize a phase retardation characteristic suitable for a purpose to be applied.

The liquid crystal layer may further include an anti-static agent to control a sheet resistance within the range to be described below when needed. Such an anti-static agent may be included in the liquid crystal layer, for example, by being introduced into the liquid crystal composition. As the anti-static agent, various kinds of anti-static agents may be used without particular limitation, as long as they have suitable compatibility with other components constituting the liquid crystal layer.

For example, as the anti-static agent, a suitable inorganic or organic salt may be used.

A cation included in the inorganic salt may be an alkali metal cation or an alkali earth metal cation. In this case, a particular example of the cation may be one or at least two of a lithium ion ($Li^+$), a sodium ion ($Na^+$), a potassium ion ($K^+$), a rubidium ion ($Rb^+$), a cesium ion ($Cs^+$), a beryllium ion ($Be^{2+}$), a magnesium ion ($Mg^{2+}$), a calcium ion ($Ca^{2+}$), a strontium ion ($Sr^{2+}$) and a barium ion ($Ba^{2+}$), and preferably one or at least two of a lithium ion ($Li^+$), a sodium ion ($Na^+$), a potassium ion ($K^+$), a cesium ion ($Cs^+$), a beryllium ion ($Be^{2+}$), a magnesium ion ($Mg^{2+}$), a calcium ion ($Ca^{2+}$) and a barium ion ($Ba^{2+}$). In view of ion stability and mobility, a lithium ion ($Li^+$) may be used, but the present application is not limited thereto.

An organic salt may include an onium cation. The term "onium cation" used herein may refer to an ion charged as positive, in which at least some charges are polarized to at least one atom selected from the group consisting of nitrogen (N), phosphorus (P) and sulfur (S). In the specification, the onium cation may be a cyclic or non-cyclic compound, and in the case of the cyclic compound, an aromatic saturated or unsaturated compound may be used. In addition, here, in the case of the cyclic compound, in addition to the nitrogen, phosphorus or sulfur atom, at least one hetero atom (e.g., oxygen) may be contained. In addition, the cyclic or non-cyclic compound may be optionally substituted with a substituent such as hydrogen, halogen, alkyl or aryl. In addition, in the case of the non-cyclic compound, at least one, preferably at least four, substituents may be included, and here, the substituent may be a cyclic or non-cyclic substituent, or an aromatic or non-aromatic substituent.

In one aspect, the onium cation may contain a nitrogen atom, and may be, for example, an ammonium ion. Here, the ammonium ion may be a quaternary ammonium ion or an aromatic ammonium ion. As the ammonium ion, an N-ethyl-N,N-dimethyl-N-(2-methoxyethyl)ammonium ion, an N,N-diethyl-N-methyl-N-(2-methoxyethyl)ammonium ion, an N-ethyl-N,N-dimethyl-N-propylammonium ion, an N-methyl-N,N,N-trioctylammonium ion, an N,N,N-trimethyl-N-propylammonium ion, a tetrabutylammonium ion, a tetramethylammonium ion, a tetrahexylammonium ion, or an N-methyl-N,N,N-tributylammonium ion may be used, but the present application is not limited thereto.

As the aromatic ammonium ion, at least one selected from the group consisting of pyridinium, pyridazinium, pyrimidinium, pyrazinium, imidazolium, pyrazolium, thiazolium, oxazolium and triazolium may be used, and specifically, for example, one or at least two of an N-alkyl pyridinium substituted with an alkyl group having 4 to 16 carbon atoms; 1,3-alkylmethyl imidazolium substituted with an alkyl group having 2 to 10 carbon atoms; and 1,2-dimethyl-3-alkylimidazolium substituted with an alkyl group having 2 to 10 carbon atoms may be used, but the present application is not limited thereto.

In the anti-static agent, an anion included in the inorganic or organic salt having the above-described cation may be, but is not limited to, at least one selected from the group consisting of fluoride ($F^-$), chloride ($Cl^-$), bromide ($Br^-$), iodide ($I^-$), perchlorate ($ClO_4^-$), hydroxide ($OH^-$), carbonate ($CO_3^{2-}$), nitrate ($NO_3^-$), sulfonate ($SO_4^-$), methylbenzenesulfonate ($CH_3(C_6H_4)SO_3^-$), p-toluenesulfonate ($CH_3C_6H_4SO_3^-$), carboxybenzenesulfonate ($COOH(C_6H_4)SO_3^-$), trifluoromethanesulfonate ($CF_3SO_2^-$), benzonate ($C_6H_5COO^-$), acetate ($CH_3COO^-$), trifluoroacetate ($CF_3COO^-$), tetrafluoroborate ($BF_4^-$), tetrabenzylborate ($B(C_6H_5)_4^-$), hexafluorophosphate ($PF_6^-$), trispentafluoroethyl trifluorophosphate ($P(C_2F_5)_3F_3^-)^-$), bistrifluoromethanesulfonimide ($N(SO_2CF_3)_2^-$), bispentafluoroethanesulfonimide ($N(SOC_2F_5)_2^-$), bispentafluoroethanecarbonylimide ($N(COC_2F_5)_2^-$), bisperfluorobutanesulfonimide ($N(SO_2C_4F_9)_2^-$), bisperfluorobutanecarbonylimide ($N(COC_4F_9)_2^-$), tristrifluoromethanesulfonylmethide ($C(SO_2CF_3)_3^-$), and tristrifluoromethanecarbonylmethide ($C(SO_2CF_3)_3^-$). An imide-based anion may be used to serve as an electron withdrawer, and to increase ion stability when substituted with fluorine, which has good hydrophobicity.

A ratio of the anti-static agent in the liquid crystal composition is not particularly limited, and may be suitably selected in consideration of an optical characteristic of the liquid crystal layer and a range of sheet resistance to be described below.

Figure 1:
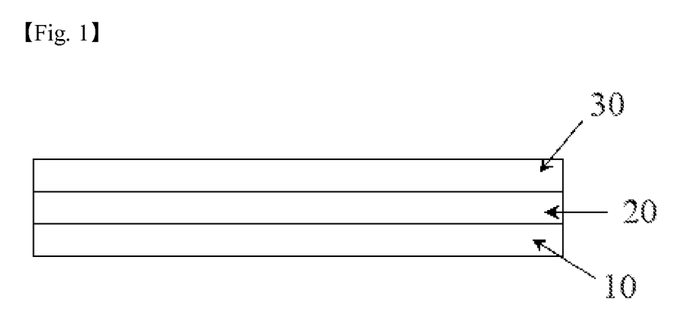
FIGS. 1 and 2 show illustrative embodiments of the optical film

The optical film may further include a base layer. The optical film may further include a base layer and an alignment layer on the base layer, and the liquid crystal layer may be present on the alignment layer. The base layer may be in a monolayer or multilayer structure. FIG. 1 is a diagram showing an optical film including a base layer 10, an alignment layer 20 and the liquid crystal layer 30.

As the base layer, for example, a glass base layer or a plastic base layer may be used. As the plastic base layer, a cellulose resin such as triacetyl cellulose (TAC) or diacetyl cellulose (DAC); a cycloolefin polymer (COP) such as a norbornene derivative; an acryl resin such as poly(methyl methacrylate) (PMMA); polycarbonate (PC); polyolefin such as polyethylene (PE) or polypropylene (PP); polyvinyl alcohol (PVA); poly ether sulfone (PES); polyetheretherketone (PEEK); polyetherimide (PEI); polyethylenenaphthalate (PEN); polyester such as polyethyleneterephthalate (PET); polyimide (PI); polysulfone (PSF) or a fluorine resin may be used.

The base layer, for example, a plastic base layer, may have a lower refractive index than the liquid crystal layer. An exemplary refractive index of the base layer may be approximately 1.33 to 1.53. When the base layer has a lower refractive index than the liquid crystal layer, brightness is improved, reflection is prevented, and a contrast is improved.

A thickness of the base layer is not particularly limited, and may be suitably controlled according to a desired use.

The optical film may further include an alignment layer between the base layer and the liquid crystal layer. The alignment layer may be a layer serving to align a liquid crystal compound in a process of forming the optical film. As the alignment layer, a conventional alignment layer known in the art, for example, an alignment layer formed by an imprinting method, a photo-alignment layer or a rubbing alignment layer may be used. The alignment layer is an optional component, and when necessary, an alignment property may be provided without an alignment layer by directly rubbing or extending the base layer.

When needed, considering the control of sheet resistance to be described below, an anti-static agent may be included in the alignment layer. The kind of an anti-static agent included in this case is not particularly limited, and for example, a kind included in the above-described liquid crystal layer may be applied. A ratio of the anti-static agent may be suitably selected without disturbing the alignment property of the alignment layer.

When needed, an anti-static agent may be included in the alignment layer in consideration of a sheet resistance within the above-described range. Such an anti-static layer may be present, for example, on the liquid crystal layer, or on or under the base layer. For example, referring to FIG. 1, the anti-static layer may be present between the base layer 10 and the alignment layer 20, on one surface of the base layer 10 not having the alignment layer 20, or on the liquid crystal layer 30. A method of forming the anti-static layer is not particularly limited, and includes, for example, coating and curing a composition including a curable resin and an anti-static agent, or depositing the anti-static agent on a desired place.

As the curable resin, a conventional resin such as an acryl resin, an epoxy resin, a urethane resin, a phenol resin, or a polyester resin may be used, and for process convenience, a UV curable acryl binder resin may be used.

In addition, the kind of the anti-static agent used to form the anti-static layer is not particularly limited, and for example, the anti-static agent may be an inorganic salt or an organic salt, or another conductive material.

As the other conductive material, a metal such as tin-doped indium oxide (ITO), antimony-doped zinc oxide (AZO), antimony-doped tin oxide (ATO), SnO, $RuO_2$, $IrO_2$, gold, silver, nickel, copper and palladium, a metal oxide or an alloy material; or a conductive polymer such as polyaniline, polyacetylene, polypyrrole, polythiophene, polyparaphenylene, polydienylene, polyphenylene vinylene, polyphenylene sulfide or polysulfurnitride may be used. As the conductive material, a conductive material in which the above-described metal, metal oxide or alloy material is deposited on a surface of a core formed of a polymer, thereby forming a shell may be used.

In the formation of the anti-static layer, a blending ratio of the resin or the anti-static agent or a thickness of the anti-static layer is not particularly limited, and a known method may be applied in consideration of desired sheet resistance.

The optical film may further include a polarizing layer. Such a polarizing layer may serve as the visible side polarizing layer, for example, when the optical film is applied to a display device requiring a polarizer layer on the visible side.

Figure 2:
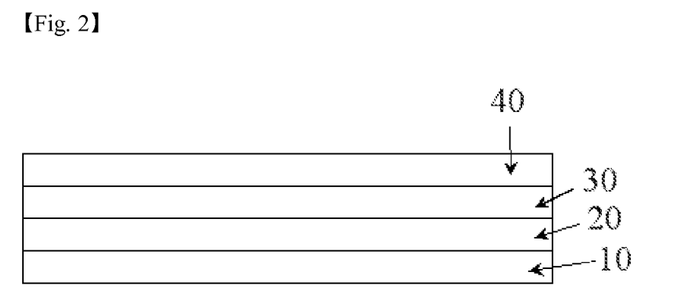

The polarizing layer may be disposed on or under a liquid crystal layer, and FIG. 2 shows a structure of an exemplary optical film in which a polarizing layer 40 is disposed on a liquid crystal layer 30.

The polarizing layer is a functional layer capable of extracting light vibrating in one direction from incident light vibrating in several directions, and a kind of the polarizing layer is not particularly limited as long as it serves the above-described functions. As the polarizing layer, for example, a conventional polarizer such as a poly(vinyl alcohol) (PVA) polarizer may be used. Alternatively, in another example, as the polarizing layer, a lyotropic liquid crystal (LLC)-aligned layer or a coating layer in which a liquid crystal composition including a polymerizable liquid crystal compound and a dichroic pigment are aligned may be used. When needed, such a polarizing layer may be attached to the liquid crystal layer or base layer with a suitable pressure-sensitive adhesive or adhesive.

When the polarizing layer is included, it may be disposed to have an angle between an absorption axis of the polarizing layer and an optical axis of the liquid crystal layer of approximately 40 degrees to 50 degrees, 42 degrees to 48 degrees, or 45 degrees. In such a range, desired characteristics of the optical film may be suitably performed.

The optical film may have a sheet resistance of, for example, approximately $10^{12}\Omega$ or less, $10^{11}\Omega$ or less, $10^{10}\Omega$ or less or $10^9\Omega$. Usually, the optical film including the liquid crystal layer has a high sheet resistance of approximately $10^{13}\Omega$, and when the layer having the sheet resistance in such a range is disposed at the outermost side, it is likely to damage a product because of vulnerability to static electricity. Accordingly, to control the above-described range of sheet resistance in the optical film, the above-described anti-static agent or an anti-static layer may be used.

To ensure the above range of sheet resistance, the optical film may have various structures. For example, referring to FIG. 1, the optical film may have a structure in which an anti-static agent is added to a liquid crystal layer 30 and/or an alignment layer 20, a structure in which an anti-static layer is formed between the alignment layer 20 and a base layer 10, or a structure in which an anti-static layer is formed between the alignment layer 20 and the base layer 10 and an anti-static agent is added to the liquid crystal layer 30 and/or the alignment layer 20.

Here, the lower limit of the sheet resistance of the optical film is not particularly limited, and the sheet resistance may be determined within a range of, for example, $10^7\Omega$ or more or $10^8\Omega$ or more.

Such an optical film may be manufactured without particular limitation. For example, the liquid crystal layer of the optical film may be formed by forming an alignment layer on a base layer, coating a liquid crystal coating solution capable of forming the liquid crystal layer on the alignment layer, and polymerizing the coating solution while the liquid crystal coating solution is aligned. Here, the liquid crystal coating solution may be prepared by blending the above-described polymerizable liquid crystal compound, reactive compound and/or anti-static agent in the above-described ratio, and when needed, blending other additives such as a polymerization initiator. Thus, the method of preparing such a liquid crystal coating solution is known in the art.

In addition, the anti-static layer may be formed by coating and curing the above-described coating solution including a resin and an anti-static agent, or depositing the anti-static agent in a desired part.

An alignment layer may be formed by, for example, forming a polymer layer of polyimide on a base layer, rubbing the polymer layer or coating the polymer layer with a photoalignable compound, and performing alignment by radiating linearly polarized light, or performing imprinting such as nano imprinting. In this field, considering a desired aligning direction, various methods of forming the alignment layer are known. The alignment layer may be formed by, for example, simply rubbing the base layer without forming a separate layer.

After the liquid crystal layer is formed by the above-described method, when needed, the polarizing layer may be additionally attached or formed by a known method.

Another aspect of the present application provides a display device including the optical film. Here, the optical film may be disposed, for example, at the outermost side of the display device. For example, when the display device is a display device including a polarizing layer disposed on a visible side, the optical film may be disposed on an outer side of the polarizing layer, that is, toward an observer.

The display device to which the optical film is applied is not particularly limited, and for example, may be various LCDs and OLEDs including VA, IPS, TN and OCB modes.

A location of the optical film in the display device and/or an application method are/is not particularly limited, and a known method may be applied.

For example, the LCD may usually include a back light, an internal polarizing plate, a liquid crystal panel, and a visible side polarizing plate, which are sequentially disposed, and the optical film may be disposed on an outside of the polarizing plate.

The OLED may usually include an optical film such as a quarter wave plate (QWP) to prevent reflection of the outside of an organic light emitting diode and a polarizing plate, which are sequentially disposed, and the optical film may be disposed on an outside of the polarizing plate.

Accordingly, for example, the display device may include a liquid crystal panel or an OLED and further include a polarizing layer disposed on an outside of the liquid crystal panel or OLED, and the optical film may be disposed on an outside of the polarizing layer.

The use of the optical film is not limited, and for example, the optical film may be used as a protective film of a polarizing plate, or a retardation film, a viewing angle compensation film or a brightness-enhancing film in various modes of LCDs or OLEDs.

Technical Effects

The present application may provide an optical film of the present application can be disposed at the outermost side of a display device such as an LCD or an OLED, or at an outside of a polarizing layer of the display in which the polarizing layer is disposed at a visible side. The film disposed as described above can overcome degradation of brightness that can occur when an observer watches an image with polarizing sunglasses. The optical film can also have hardness suitable for its use.

EXPLANATION OF MARKS

40: the liquid polarizing layer
30: the liquid crystal layer
20: the alignment layer
10: the base layer

ILLUSTRATIVE EMBODIMENTS

Hereinafter, an optical film will be described in detail with reference to Examples and Comparative Examples, but the scope of the present application is not limited to the following Examples.

1. Measurement of Surface Hardness

Surface hardness of liquid crystal layers formed in Examples and Comparative Examples was measured at a pencil weight of 500 g and a pencil moving rate of 250 mm/min according to ASTM D3363.

2. Measurement of Retardation

Retardation was measured using light with a wavelength of 550 nm or 589 nm. Sixteen Muller matrixes of retardation films were subjected to measurement of retardation according to a manufacturer's manual using equipment capable of measuring sixteen Muller matrixes, Axoscan (Axomatrics), and thus the retardation was extracted.

3. Measurement of Sheet Resistance

Sheet resistance was measured using a sheet resistance measurer, HIRESTA-UP (MCP-HT450; Mitsubishi Chemical), according to a manufacturer's manual.

4. Evaluation of Alignment Property

Aligning properties of liquid crystals in Examples and Comparative Examples were evaluated by placing a liquid crystal layer between two polarizers whose light absorption axes were perpendicular to each other, and observing retardation expressed by a liquid crystal film and its uniformity while radiating light to one surface.

Structures of polymerizable liquid crystal compounds and reactive non-liquid crystal compounds used in Examples and Comparative Examples were as follows.

Polymerizable Liquid Crystal Compound

[Formula B]

Reactive Non-Liquid Crystal Compound

[Formula J]

[Formula K]

Examples 1 to 4 and Comparative Examples 1 to 4

A coating solution for forming an alignment layer was prepared by dissolving 20 g of 5-norbornene-2-methyl-(4-methoxy cinnamate) as a photoreactive polymer, 20 g of dipentaerythritol hexaacrylate and 5 g of Irgacure OXE02 (Ciba-Geigy, Swiss) as a photoinitiator in 980 g of cyclopentanone, the coating solution was coated on a triacetyl cellulose (TAC) film to have a thickness after drying of approximately 1,000 Å, and dried with hot wind in a dry oven at 70° C. for 2 minutes, thereby forming a layer. Subsequently, the TAC film having the layer was transferred in one direction, and exposed once at a rate of 3 m/min while radiating linearly-polarized UV rays to the film using a high pressure mercury lamp (80 w/cm) as a light source and a wire grid polarizing plate (Moxtek), thereby providing an alignment property.

Afterward, a coating solution for forming a liquid crystal layer was prepared by dissolving a mixture prepared by blending 5 parts by weight of a photoinitiator (Irgacure 907, Ciba-Geigy (Swiss)) in 95 parts by weight of a mixture prepared by blending a polymerizable liquid crystal compound in a composition ratio shown in Table 1, and in some cases, further blending a reactive non-liquid crystal compound, in toluene to have a solid content of approximately 25 weight %. Afterward, the coating solution was coated on the alignment layer to have a thickness after drying of approximately 1 µm, and dried with hot wind in a dry oven at 60° C. for 2 minutes. Then, UV rays were radiated using a high pressure mercury lamp (80 w/cm) at 300 mJ/cm², and the coating solution was cured, thereby forming a liquid crystal layer. Thus, an optical film was manufactured.

TABLE 1

| | | | Example | | | | Comparative Example | | | |
|---|---|---|---|---|---|---|---|---|---|---|
| | | | 1 | 2 | 3 | 4 | 1 | 2 | 3 | 4 |
| RM material | RM compound | B | 50 | 45 | 48.5 | 43.5 | 100 | 70 | 47.5 | 47.5 |
| | | D | 50 | 45 | 48.5 | 43.5 | | 30 | 47.5 | 47.5 |
| | | G | | 10 | | 10 | | | | |
| Reactive non-liquid crystal compound | | J | | | | | | | 5 | |
| | | K | | 3 | 3 | | | | | 5 |

Content Unit: g

Results for evaluating physical properties with respect to Examples and Comparative Examples are summarized in Table 2.

TABLE 2

|  | Example | | | | Comparative Example | | | |
| --- | --- | --- | --- | --- | --- | --- | --- | --- |
|  | 1 | 2 | 3 | 4 | 1 | 2 | 3 | 4 |
| Surface hardness | 1H | 2H | 2H | 3H | 2B | 1B | 1H | 2H |
| Aligning properties | ○ | ○ | ○ | ○ | ○ | ○ | X | X |
| In-plane retardation (nm) | approximately 120 to 130 | | | | approximately 120 to 130 | | | |

Alignment property: ○: aligned, X: not aligned

Example 5

An optical film was formed through the same process as described in Example 1, except that an anti-static agent (methacroylcholine chloride, TCI) was added to a mixture of a polymerizable liquid crystallizing compound and a reactive non-liquid crystal compound to have a concentration of 3 weight %.

Example 6

An optical film was formed through the same process as described in Example 1, except that a cycloolefin polymer (COP) film on a surface of which a coating layer was formed of a conductive polymer (Aedotron™) manufactured by TDA was used instead of the TAC film.

Example 7

An optical film was formed by the same method as described in Example 5, except that a COP film on a surface of which a coating layer was formed of a conductive polymer (Aedotron™) manufactured by TDA was used instead of the TAC film.

Example 8

An optical film was manufactured through the same process as described in Example 5, except that a coating solution to which a conductive polymer (Aedotron™) manufactured by TDA was added in a ratio of approximately 10 wt % was used in the preparation of the coating solution for an alignment layer.

Results for measuring sheet resistance with respect to Examples 5 to 8 are summarized in Table 3.

TABLE 3

|  | Example | | | |
| --- | --- | --- | --- | --- |
|  | 5 | 6 | 7 | 8 |
| Surface hardness | 1H | 1H | 1H | 1H |
| Alignment property | ○ | ○ | ○ | ○ |
| In-plane retardation (nm) | approximately 120 to 130 | | | |
| Sheet resistance (×$10^9$Ω) | 1000 | 100 | 1 | 1 |

Experimental Example

When optical films manufactured in Examples 1 to 8 and Comparative Examples 1 and 2 were disposed on a visible side polarizing plate of a conventional LCD to have an angle between an absorption axis of the visible side polarizing plate and an optical axis (slow axis) of the liquid crystal layer of approximately 45 degrees, a brightness meter was disposed on a back surface of general polarizing glasses while the LCD was driven, and the brightness was measured, and when the optical film of Example was present, significant change in the brightness according to change in the polarization axis of the polarizing glasses was not observed. In the cases of Comparative Examples 1 and 2, in the beginning, similar results to those of Examples were obtained, but it was confirmed that the films were easily damaged by scratches in use, thereby degrading performance over time.

What is claimed is:

1. An optical film, which is disposed at the outermost side of a display device or at an outside of a polarizing layer of the display device in which the polarizing layer is disposed at a visible side, comprising:
   a liquid crystal layer having an in-plane retardation with respect to light with a wavelength of 550 nm of 80 nm to 200 nm, and a surface hardness of 3H or more,
   wherein the liquid crystal layer is a cured layer of a liquid crystal composition comprising a polymerizable liquid crystal material, the polymerizable liquid crystal material comprising:
      a monofunctional polymerizable liquid crystal compound, a multifunctional polymerizable liquid crystal compound, and reactive non-liquid crystal compound in 5 parts by weight or less with respect to 100 parts by weight of the polymerizable liquid crystal material,
   wherein the ratio of multifunctional liquid crystal compound in the polymerizable liquid crystal material is 50 wt % to 90 wt %,
   wherein the multifunctional liquid crystal compound comprises a liquid crystal compound having two polymerizable functional groups, and a liquid crystal compound having at least three polymerizable functional groups, and
   wherein a weight ratio of the liquid crystal compound having at least three polymerizable functional groups in the polymerizable liquid crystal material is in a range of 8 wt % to 20 wt %.

2. The optical film according to claim 1, wherein a thickness-direction retardation of the liquid crystal layer with respect to light with a wavelength of 550 nm is from −20 nm to 20 nm.

3. The optical film according to claim 1, of which a sheet resistance is $10^{12}$Ω or less.

4. The optical film according to claim 1, wherein the liquid crystal composition further comprises a non-liquid crystal compound having at least four functional groups capable of reacting with a polymerizable liquid crystal compound.

5. The optical film according to claim 4, wherein the non-liquid crystal compound has at least four functional groups capable of reacting with the polymerizable liquid crystal compound, and has a molecular weight or weight average molecular weight of 200 to 5,000 or 200 to 1,000.

6. The optical film according to claim 1, further comprising:
   a base layer; and
   an alignment layer formed on a surface of the base layer, the liquid crystal layer being on the alignment layer.

7. The optical film according to claim 6, wherein the alignment layer or the liquid crystal layer has an anti-static agent.

8. The optical film according to claim 1, further comprising: an anti-static layer.

9. The optical film according to claim 6, wherein an anti-static agent is included in the alignment layer or the liquid crystal layer, and an anti-static layer is further formed between the base layer and the alignment layer.

10. The optical film according to claim 1, further comprising:
a polarizing layer disposed on or under the liquid crystal layer.

11. The optical film according to claim 10, wherein an angle between an absorption axis of the polarizing layer and an optical axis of the liquid crystal layer is in the range of 40 degrees to 50 degrees.

12. A display device, comprising:
the optical film of claim 1 disposed at the outermost side.

13. A display device, comprising:
a polarizing layer disposed at a visible side; and
the optical film of claim 1, which is disposed at the outside of the polarizing layer.

* * * * *